(12) United States Patent
Currivan

(10) Patent No.: US 8,457,584 B2
(45) Date of Patent: Jun. 4, 2013

(54) SYSTEMS AND METHODS TO ATTENUATE INTERMODULATION INTERFERENCE

(75) Inventor: Bruce J. Currivan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1290 days.

(21) Appl. No.: 11/218,596

(22) Filed: Sep. 6, 2005

(65) Prior Publication Data

US 2007/0004360 A1 Jan. 4, 2007

Related U.S. Application Data

(60) Provisional application No. 60/685,528, filed on May 31, 2005.

(51) Int. Cl.
*H04B 1/10* (2006.01)

(52) U.S. Cl.
USPC ....... 455/295; 455/296; 370/240.18; 370/346

(58) Field of Classification Search
USPC .......................................... 455/295
See application file for complete search history.

(56) References Cited

U.S. PATENT DOCUMENTS

| | | | | |
|---|---|---|---|---|
| 6,794,938 B2 * | 9/2004 | Weldon | | 330/149 |
| 6,804,313 B2 * | 10/2004 | Skafidas et al. | | 375/350 |
| 6,804,501 B1 * | 10/2004 | Bradley et al. | | 455/138 |
| 6,986,092 B2 * | 1/2006 | Butler et al. | | 714/752 |
| 7,053,709 B1 * | 5/2006 | Darvish-Zadeh et al. | | 330/149 |
| 7,327,754 B2 * | 2/2008 | Mills et al. | | 370/463 |
| 2003/0016741 A1 * | 1/2003 | Sasson et al. | | 375/229 |
| 2003/0021367 A1 * | 1/2003 | Smith | | 375/346 |
| 2004/0213146 A1 * | 10/2004 | Jones et al. | | 370/210 |
| 2005/0089101 A1 * | 4/2005 | Tellado et al. | | 375/240.18 |
| 2006/0128339 A1 * | 6/2006 | Petrovic | | 455/296 |
| 2008/0159453 A1 * | 7/2008 | Smith | | 375/350 |

OTHER PUBLICATIONS

Ghaderi, M., Ph.D. et al., "Fast Adaptive Polynomial I and Q Predistorter with Global Optimisation," IEE Proc-Commun., vol. 143, No. 2, Apr. 1996 pp. 78-86.

* cited by examiner

*Primary Examiner* — Ajibola Akinyemi
(74) *Attorney, Agent, or Firm* — Sterne, Kessler, Goldstein & Fox P.L.L.C.

(57) ABSTRACT

The present invention is directed to systems and method for attenuating intermodulation interference. In particular, methods and systems to attenuate intermodulation interference contained within an aggregate signal having a transmitted signal that was transmitted over a communications channel having channel effects that produce the intermodulation interference are provided. The communications channel may be a cable television distribution network and the signal may be a cable television signal. A method is provided to predict when intermodulation interference will be large, so that actions within a receiver can be taken to reduce the impact of the interference and improve overall receiver performance.

12 Claims, 8 Drawing Sheets

SYSTEMS AND METHODS TO ATTENUATE INTERMODULATION INTERFERENCE

CROSS REFERENCE TO RELATED APPLICATIONS

The present application claims priority to U.S. Provisional Patent Application No. 60/685,528, entitled Systems and Methods to Attenuate Intermodulation Interference, filed on May 31, 2005 by Bruce J. Currivan, which is hereby expressly incorporated by reference in its entirety.

BACKGROUND OF THE INVENTION

1. Field of the Invention

The present invention relates to cable television distribution networks, and more specifically to canceling intermodulation products within communications signals transmitted on cable television distribution networks.

2. Background of Invention

A downstream cable TV plant typically carries tens to hundreds of carrier signals used to transmit television, Internet and other data information. These carriers are arranged in a frequency division multiplexed ("FDM") format with six megahertz ("Mhz") spacing between carriers in North America and eight Mhz spacing in Europe.

A cable plant contains non-linear elements, such as amplifiers and laser drivers that introduce intermodulation ("IM") interference. When the carrier signals pass through such non-linearities, intermodulation interference is generated within the carrier signals. This interference is referred to as IM products. The IM products occur in frequencies which are the sum and difference of multiples of carrier frequencies and generally fall in the bands of the desired signals, where they interfere with the desired signals.

IM products are typically time varying within a signal envelope. The IM spectrum may contain a series of narrow lines, especially if the plant contains many analog TV carriers such as in the case of a National Televison System Committee ("NTSC") formatted signal. The NTSC standard for television defines a composite video signal with a refresh rate of 60 half-frames (interlaced) per second. Each frame contains 525 lines and can contain 16 million different colors. The IM spectrum may be spread (i.e., not predominated by spectral lines) if the plant contains mostly digital carriers. Some of the digital carriers may be data-bearing signals, such as Data Over Cable Service Interface Specification ("DOCSIS") signals. DOCSIS signals are used to support cable modem data transmission. Second order IM products are referred to as composite second order ("CSO") products and third order IM products are referred to as composite triple beat ("CTB") products.

Because the IM products interfere with a desired signal, methods to remove or attenuate the IM interference are needed. Typical approaches attempt to address this problem at the transmitter end of a cable plant. These approaches often assume the availability of original undistorted data or knowledge of the nonlinearity. These systems are limited in their ability to remove or attenuate IM interference because often a readily accessible version of the original undistorted signal and/or knowledge of the nonlinearity transfer characteristics are not well known.

What are needed are methods to reduce IM interference that do not require knowledge of the non-linearity and access to an original undistorted signal.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
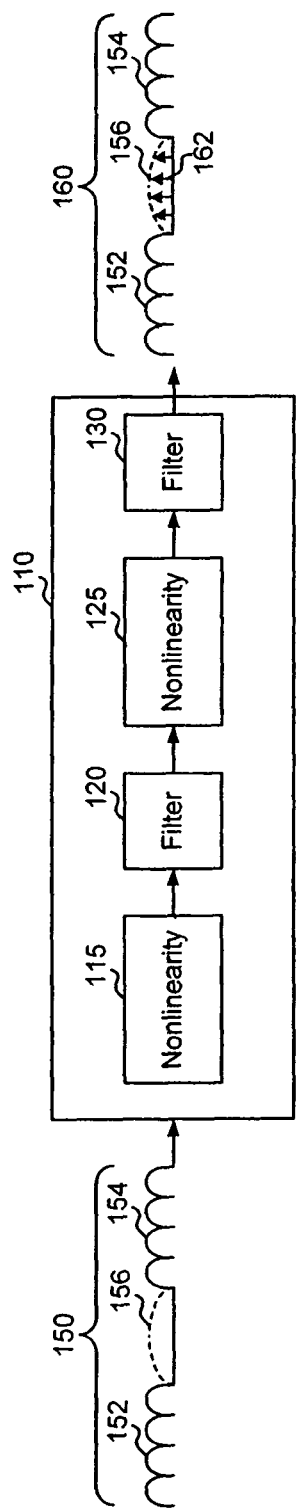
FIG. 1 is a diagram representing a signal transmitted through a model of a non-linear cable television distribution plant.

FIG. 1 is a diagram showing a signal transmitted through a model of a non-linear cable television distribution plant. Within a cable television distribution plant, aggregate cable television signals including multiple carriers, as represented by transmitted signal 150, are transmitted through cable television networks, as represented by network 110, to provide an aggregate output signal, as represented by signal 160.

Transmitted signal 150 includes frequencies that carry cable television channel information, such as signal portions 152, 154, and 156. When a cable signal, such as transmitted signal 150, passes through a cable television network, the cable television network introduces intermodulation interference within a portion of the transmitted signal. The intermodulation interference interferes with desired signals and prevents efficient use of a portion of the spectrum.

Aggregate signal 160 illustrates transmitted signal 150 after it has passed through cable television network 110. Aggregate signal 160 includes the original signal portions 152, 154 and 156, but also includes intermodulation interference signals 162, which are located within signal portion 156. The existence of intermodulation interference signals 162 will reduce the signal quality within signal portion 156 and degrade overall system performance. As discussed above, the non-linear elements of a cable plant, such as amplifiers and laser drivers introduce intermodulation interference. When the carrier signals pass through such non-linearities, intermodulation ("IM") interference is generated within the carrier signals. This interference is referred to as IM products. The IM products occur in frequencies which are the sum and difference of multiples of carrier frequencies and generally fall in the bands of the desired signals, where they interfere with the desired signals.

Cable television network 110 can be modeled as a series of non-linearities and filters, such as, for example, non-linearity 115, filter 120, non-linearity 125 and filter 130. The non-linearities can be caused by amplifiers and laser drivers. In this example, a transmitted signal encounters the effects produced by non-linearity 115, then filter 120, then non-linearity 125 and finally filter 130.

The methods to attenuate intermodulation interference disclosed below take advantage of the advent of modern analog-to-digital technology, which enables an aggregate signal to be available digitally in an integrated circuit. Hence, all digital methods can be used to perform the cancellations needed. Furthermore, the methods focus on canceling the intermodulation products in a relatively narrow band of interest, nor over the entire band of the aggregate signal. This aids in simplify the systems needed to attenuate or cancel the intermodulation products. For example, with DOCSIS and digital cable downstream signals, the signal of interest may occupy a six MHz band, whereas the aggregate signal occupies a band from 54 to 860 MHz, for a bandwidth of over 800 MHz. Furthermore, other efficiencies can be gained in implementing the methods described below based on the application. For example, in a cable distribution plant most discrete interference comes from the analog TV channels, which occupy a band from 54 to around 550 MHz. Hence, efficiencies can be gained by processing the analog channels only, and saving processing bandwidth.

Figure 2:
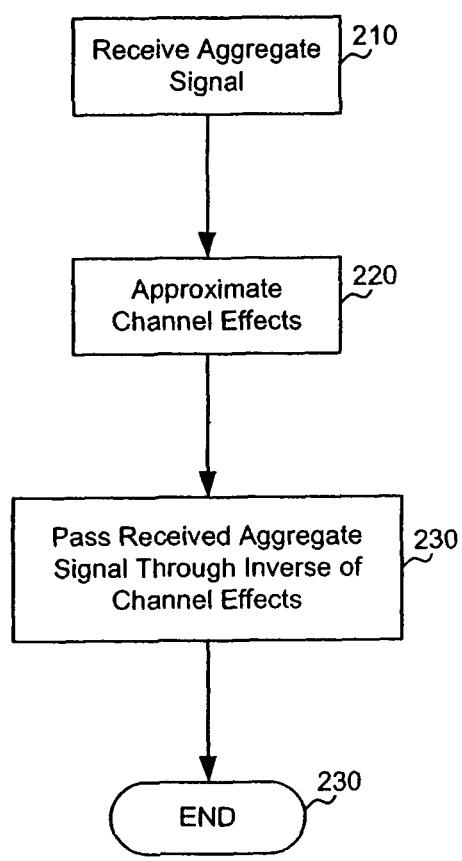
FIG. 2 is a flow chart of an inverse method to attenuate intermodulation interference.

FIG. 2 provides a method 200 to attenuate intermodulation interference according to an embodiment of the invention. Method 200 attenuates intermodulation interference contained within an aggregate signal of a signal that was transmitted over a communications channel having channel effects that produce the intermodulation interference. The communications channel may be a route within a cable television network and the transmitted signal may be a cable television signal.

Method 200 begins in step 210. In step 210 an aggregate signal, such as, for example, aggregate signal 160 is received. As illustrated in FIG. 1, aggregate signal 160 will include a transmitted signal and intermodulation interference introduced by channel effects of the cable television network. In step 220, the channel effects on the transmitted signal are approximated. Thus, for example, the channel effects represented by non-linearity 115, filter 120, non-linearity 125 and filter 130 can be modeled. In step 230 the aggregate signal is passed through an inverse of the approximated channel effects to approximately remove or attenuate the intermodulation interference. Thus, for example, the received aggregate signal would be passed through an inverse of non-linearity 115, an inverse of filter 120, an inverse of non-linearity 125 and an inverse of filter 130. Each inverse is only an approximation, since the channel effects are not assumed to be exactly known. Also, there will be some intermodulation interference produced between the desired signal and other portions of the aggregate signal. Hence, some intermodulation interference can still exist within the signal after it is passed through the approximation of the inverse of the channel effects. Method 200 ends in step 240.

The inversion described within method 200 can only be done practically if the channel components are all invertible. Gradual non-linearities are invertible. Sudden, severe non-linearities, such as clipping, are not. Also, filters with deep nulls are not invertible in a practical sense. Thus, method 200 has limitations with respect to its effectiveness within existing cable networks, in which signals will often encounter severe non-linearities.

Figure 3:
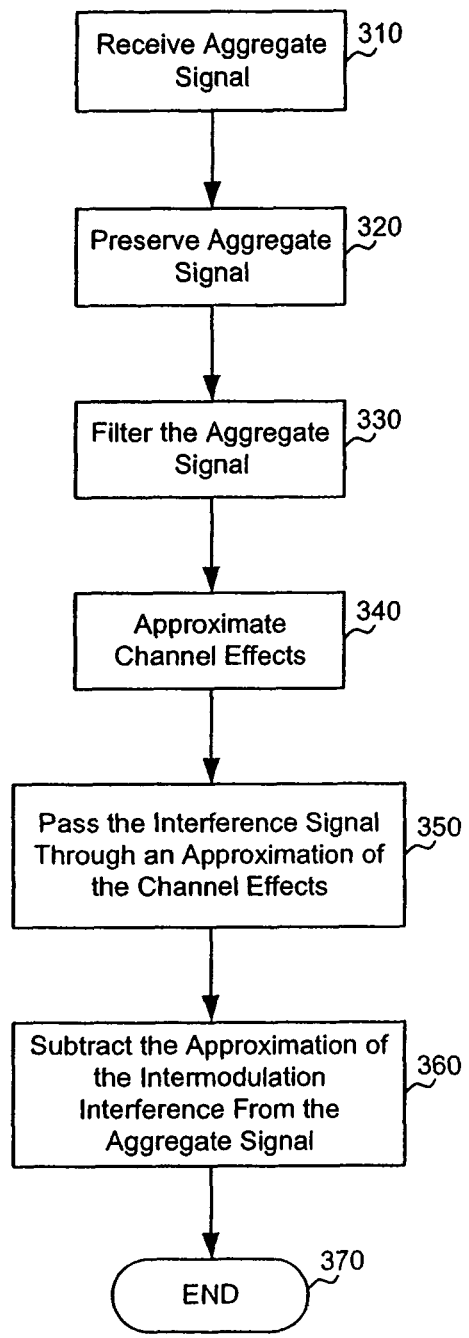
FIG. 3 is a flow chart of a subtractive method to attenuate intermodulation interference.

FIG. 3 provides method 300 to cancel intermodulation interference. As in the case of method 200, method 300 cancels intermodulation interference contained within an aggregate signal of a transmitted signal that was transmitted over a communications channel having channel effects that produce the intermodulation interference. Method 300 includes additional steps to improve upon the attenuation of the intermodulation interference signals. The communications channel may be a route within a cable television network and the transmitted signal may be a cable television signal.

Method 300 begins in step 310. In step 310 an aggregate signal, such as, for example, aggregate signal 160 is received. As illustrated in FIG. 1, aggregate signal 160 will include a transmitted signal and intermodulation interference introduced by channel effects of the cable television network. In step 320, the aggregate signal is preserved. In step 330 the aggregate signal is filtered to remove the desired signal and create an interference signal comprising the signals that produced the intermodulation interference and the intermodulation interference.

In step 340, the channel effects on the transmitted signal are approximated. Thus, for example, the channel effects represented by non-linearity 115, filter 120, non-linearity 125 and filter 130 can be modeled. In step 350 the interference signal is passed through an approximation of the channel effects to create an approximation of the intermoduation interference. Thus, for example, the interference signal is passed through an approximation of non-linearity 115, filter 120, non-linearity 125 and filter 130. In step 360 the approximation of the intermodulation interference is subtracted from the aggregate signal that was preserved in step 320 to produce an output signal in which the intermodulation interference has been attenuated from the received aggregate signal.

Figure 4:
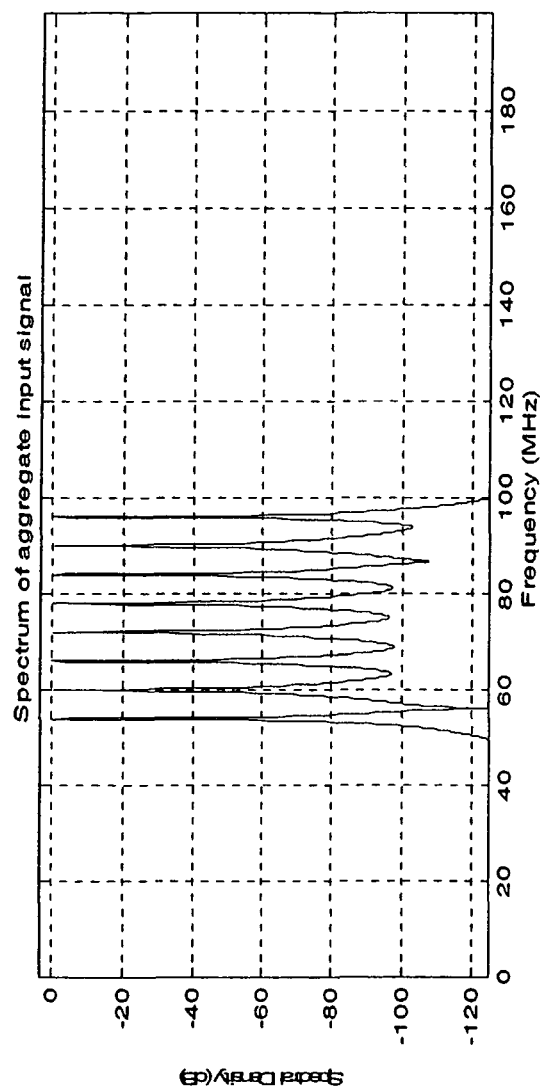
FIG. 4 is a chart of the spectrum of a simulated transmitted signal.

The following sequence of simulated spectrum plots illustrates the effectiveness of method 300. FIG. 4 shows the spectrum of a transmitted signal, such as transmitted signal 150. FIG. 4 plots frequency along the horizontal axis and spectral density in dB along the vertical axis. FIG. 4 shows that the transmitted signal includes multiple carriers at frequencies ranging between 50 and 100 Mhz. To simulate the effects of transmitting the signal through a cable television network, the transmitted signal shown in FIG. 4 is passed through a $5^{th}$ order, memoryless nonlinearity with the transfer function:

$$y=x+a_2x^2+a_3x^3+a_4x^4+a_5x^5$$

where $a_2=10^{-5}$ $a_3=10^{-4}$ $a_4=10^{-5}$ $a_5=10^{-5}$

Figure 5:
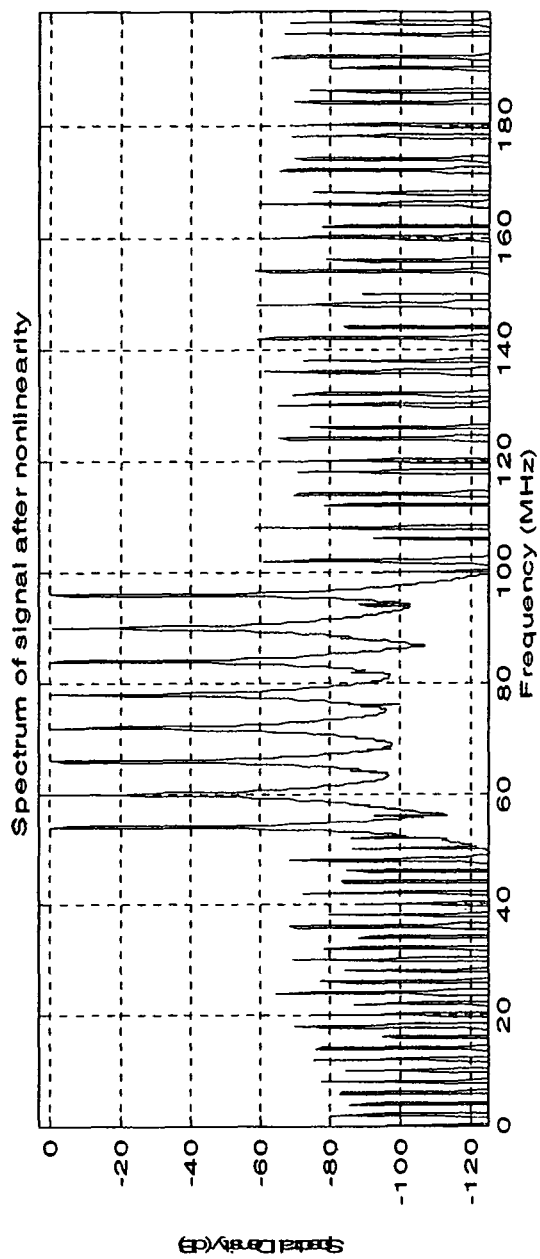
FIG. 5 is a chart of the spectrum of a simulated transmitted signal having intermodulation interference.

In this simplified example, no filtering is assumed to exist in the cable television network and only a single non-linearity exists. FIG. 5 shows the aggregate signal, for example signal 160, that results from passing the signal illustrated in FIG. 4 through a non-linear plant with the transfer function assumed above. FIG. 5 plots frequency along the horizontal axis and spectral density in dB along the vertical axis. FIG. 5 shows that the aggregate signal includes multiple carriers at frequencies ranging between 50 and 100 Mhz—the original transmitted signal, but also shows the intermodulation interference that was introduced by the transfer function.

The signal illustrated in FIG. 5 is then passed through an approximation of the non-linearity channel effects to produce the estimated intermodulation interference. The estimated intermodulation interference is then subtracted from the aggregate signal depicted in FIG. 5. In this simplified example, the estimated non-linearity channel effects uses the exact coefficients ($a_2$ through $a_5$) of the plant non-linearity. In an actual system, the coefficients would be estimated using an adaptive approach. Approaches for estimating the coefficients include, but are not limited to, a least mean square (LMS) method, a recursive least squares (RLS) method, and a minimum mean squared error (MMSE) method.

Figure 6:
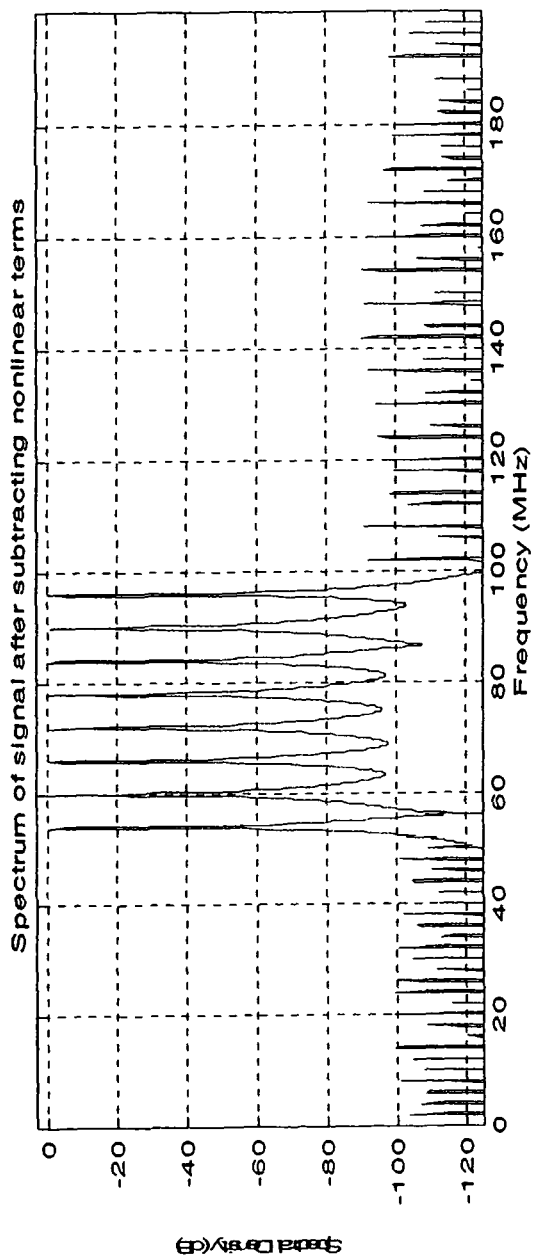
FIG. 6 is a chart of the spectrum of a simulated transmitted signal having intermodulation interference in which the intermodulation interference has been attenuated.

This process produces the signal illustrated in FIG. 6. The signal illustrated in FIG. 6 is equivalent to a signal produced through method 300. FIG. 6 plots frequency along the horizontal axis and spectral density in dB along the vertical axis. FIG. 6 shows that the aggregate signal includes multiple carriers at frequencies ranging between 50 and 100 Mhz—the original transmitted signal, but also shows the intermodulation interference, which has been attenuated by approximately 30 dB.

Figure 7:
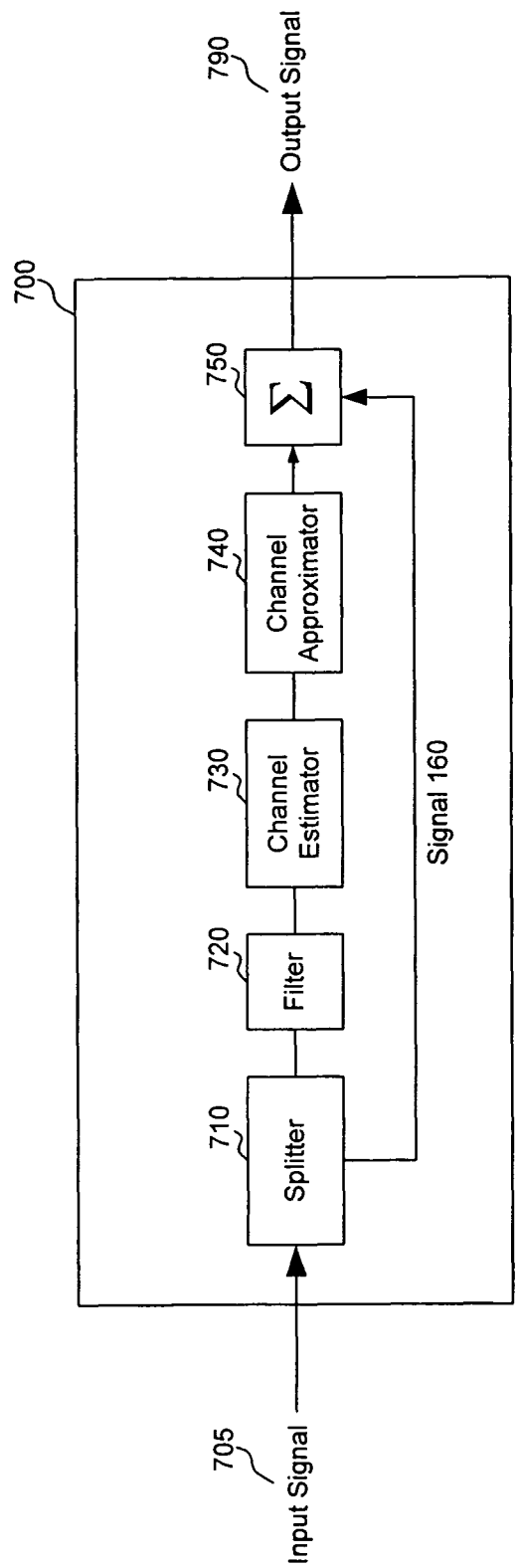
FIG. 7 is a diagram of an intermodulation interference attenuation system.

FIG. 7 shows an intermodulation interference attenuation system 700 to remove intermodulation interference. Intermodulation interference attenuation system 700 attenuates intermodulation interference within an aggregate signal containing a desired signal and intermodulation interference that was transmitted over a communications channel having channel effects that produce the intermodulation interference. In particular, intermodulation interference attenuation system 700 can be used to implement method 300 described above. The communications channel may be a cable television distribution network and the transmitted signal may be a cable television signal.

Intermodulation interference attenuation system 700 includes a splitter 710, a filter 720, a channel estimator 730, a channel approximator 740 and an adder 750. Splitter 710 receives input signal 705, which is an aggregate signal. The aggregate signal includes a desired transmitted signal (e.g., a cable television signal) and intermodulation interference that was introduced by the communications channel. An output of splitter 710 is coupled to filter 720 and an additional output is coupled to adder 750. The output coupled to adder 750 serves to preserve the received aggregate signal for subsequent processing.

Filter 720 is coupled to splitter 710. Filter 720 removes the desired signal, such that all that remains are the adjacent signals.

Channel estimator 730 is coupled to filter 720. Channel estimator 730 does not modify the output from filter 720. Rather, channel estimator 730 uses the output to estimate a transfer function representing the impacts of the communications channel. Channel estimator 730 can include a least mean square (LMS) estimation module, a recursive least squares (RLS) estimation module, or a minimum mean squared error (MMSE) estimation module to estimate coefficients for a transfer function. In an alternative embodiment, the original input signal containing the desired signal can also be made available to channel estimator 730. Information obtained from the original signal can be used to increase the accuracy of the channel estimation.

Channel approximator 740 is coupled to channel estimator 730. Channel approximator 740 applies the transfer function estimated by channel estimator 730 to the signal produced by filter 720. Channel approximator 740 produces a signal that approximately mimics intermodulation interference introduced by the communications channel.

Adder 750 is coupled to the output of channel approximator 740 and splitter 710. Adder 750 substracts the output of channel approximator 740, which is an approximation of intermodulation interference produced by the communications channel from the aggregate signal which contains the desired transmitted signal and intermodulation interference. The result is to produce an output signal in which intermodulation interference has been attenuated and, therefore a truer representation of the original transmitted signal exists for further processing.

Figure 8:
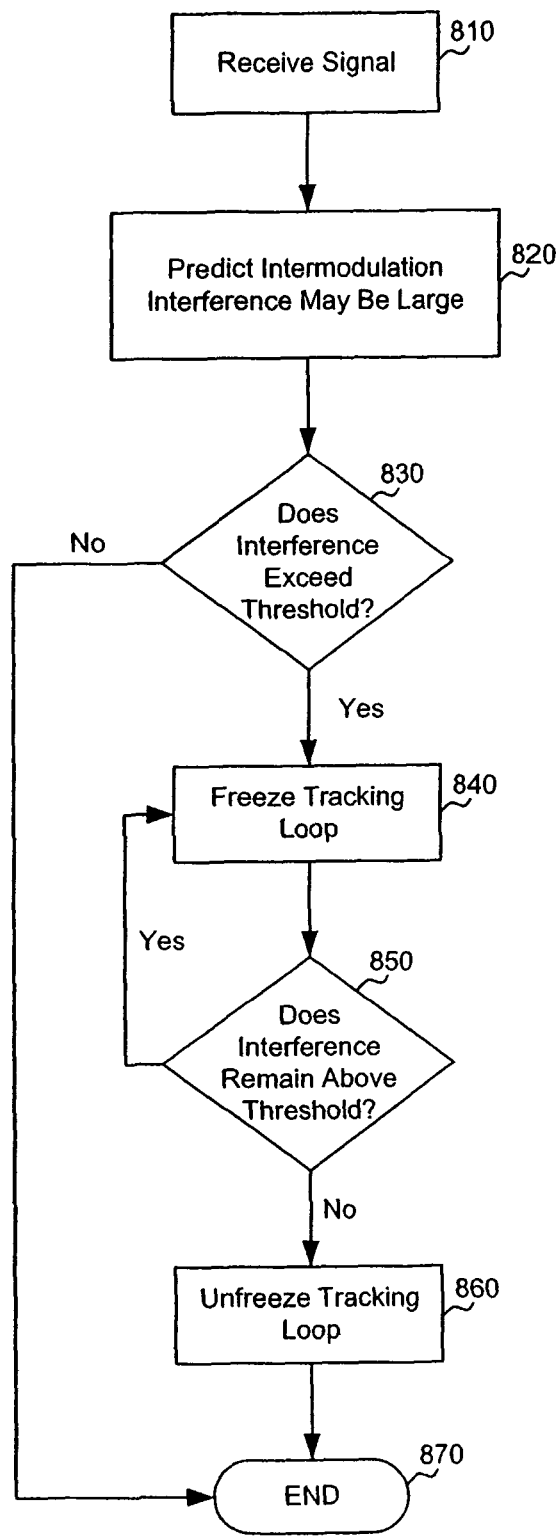
FIG. 8 is a flowchart of a method to predict intermodulation interference and take corrective action.

FIG. 8 provides method 800 for predicting that a strong intermodulation product will occur in the time domain. By knowing when a strong intermodulation product will occur, appropriate action can be taken to minimize the impact of the interference. Method 800 can be used in conjunction with methods 200 and 300 described above. Intermodulation interference is time varying, since it consists of the sum of many products which depend on an input signal, which is time varying. When the intermodulation interference is large, this may be regarded as a noise impulse occurring in the band of interest. In this instance, symbol errors will then tend to occur when the signal of interest is demodulated. Method 800 seeks to predict when the intermodulation interference will be large and to take appropriate action to reduce the number of symbol errors.

Method 800 begins in step 810. In step 810 an aggregate signal, such as signal 160, is received. In step 820 a prediction is made whether the intermodulation interference will be large. The prediction can be based on the nature of the transmitted signal and an estimation of the channel effects, which can be determined as described above with respect to methods 200 and 300. In step 830 a determination is made whether the intermodulation interference exceeds an acceptable threshold. If the intermodulation interference is beneath the acceptable threshold, method 800 proceeds to step 870 and ends. If, however, the intermodulation interference is above the acceptable threshold, method 800 proceeds to step 840. In step 840 a tracking loop for symbol recovery is frozen. In step 850 a determination is made whether the intermodulation interference remains above the acceptable threshold. If the intermodulation interference remains above the acceptable threshold, method 800 returns to step 840 and the tracking loop remains frozen. This looping continues until the intermodulation interference drops below the acceptable threshold. If the intermodulation interference has dropped below the acceptable threshold, then method 800 proceeds to step 860. In step 860 the tracking loop is unfrozen and the method proceeds to end in step 870.

Implementation of the above process can improve demodulation performance in a receiver. For example, if the phase tracking loop in a demodulator is frozen before the intermodulation impulse occurs, then re-established after the impulse subsides, the loop will not be subject to erroneous phase trajectory resulting from the impulse "hit," and better demodulation performance will result.

In another embodiment, when the intermodulation interference is predicted to be above an acceptable threshold, received symbols within the aggregate signal can be marked as erased or having a lower signal to noise ratio. A front end processor can then give the marked symbols higher performance by using this knowledge. For example, a Reed-Solomon front end processor can correct twice as many erased bytes within a marked symbol as it can in errored bytes that were in an unmarked symbol to improve performance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method to attenuate intermodulation interference contained within an aggregate signal having a desired signal that was transmitted over a communications channel with channel effects that produce the intermodulation interference, comprising:
receiving the aggregate signal, which contains the desired signal and the intermodulation interference;
preserving a copy of the aggregate signal, which contains the desired signal and the intermodulation interference;
filtering the aggregate signal to remove the desired signal and create an interference signal comprising the intermodulation interference and signals that produced the intermodulation interference;
approximating the channel effects on the transmitted signal;
passing the interference signal through the approximated channel effects to produce an approximation of the intermodulation interference; and
subtracting the approximation of the intermodulation interference from the preserved copy of the aggregate signal, which contains the desired signal and the intermodulation interference.

2. The method of claim 1, wherein the communications channel comprises a cable television distribution network.

3. The method of claim 1, wherein the desired signal comprises a cable television signal.

4. The method of claim 1, wherein approximating the channel effects on the transmitted signal includes estimating coefficients for a non-linear transfer function that represents the channel effects.

5. The method of claim 4, wherein estimating coefficients includes using at least one of a least mean square estimation, a recursive least squares estimation, and a minimum mean squared error estimation.

6. A system for attenuating intermodulation interference contained within an aggregate signal having a desired signal and intermodulation interference that was transmitted over a communications channel having channel effects that produce the intermodulation interference, comprising:
a splitter configured to receive and preserve a copy of the aggregate signal;
a filter coupled to the splitter configured to remove the desired signal from the aggregate signal and to produce an adjacent signals signal;
a channel estimator coupled to the filter configured to use the aggregate signal to determine a transfer function that estimates impact on signals transmitted over the communications channel;
a channel approximator coupled to the channel estimator configured to apply the transfer function estimated by the channel estimator to the adjacent signals signal produced by the filter and to produce an approximate intermodulation interference mimic signal; and
an adder coupled to the channel approximator that subtracts the approximate intermodulation interference mimic signal produced by the channel approximator from the copy of the aggregate signal that was preserved by the splitter.

7. The system of claim 6, wherein the channel estimator includes at least one of a least mean square estimation module, a recursive least squares estimation module, and a minimum mean squared error estimation module.

8. A method to predict when strong intermodulation interference will occur in the time domain in a receiver, comprising:
receiving an aggregate signal;
predicting a magnitude of intermodulation interference within the received aggregate signal by:
estimating a transfer function for a communications channel upon which the received aggregate signal was transmitted based on the received aggregate signal; and
applying that transfer function to estimate intermodulation interference;
determining if the magnitude of intermodulation interference exceeds an acceptable level; and
taking an action to improve receiver performance when the magnitude of intermodulation interference exceeds an acceptable level.

9. The method of claim 8, wherein estimating a transfer function comprises:
using at least one of a least mean square estimation, a recursive least squares estimation, and a minimum mean squared error estimation to estimate coefficients of the transfer function.

10. The method of claim 8, wherein taking an action to improve receiver performance comprises:
freezing a phase tracking loop within a demodulator within the receiver.

11. The method of claim 8, wherein taking an action to improve receiver performance comprises:
marking received symbols within the received aggregate signal as erased when intermodulation interference is predicted to exceed an acceptable level.

12. The method of claim 8, wherein taking an action to improve receiver performance comprises:
marking received symbols within the received aggregate signal as having a lower signal to noise ratio when intermodulation interference is predicted to exceed an acceptable level.

* * * * *

UNITED STATES PATENT AND TRADEMARK OFFICE
CERTIFICATE OF CORRECTION

PATENT NO. : 8,457,584 B2
APPLICATION NO. : 11/218596
DATED : June 4, 2013
INVENTOR(S) : Bruce J. Currivan It is certified that error appears in the above-identified patent and that said Letters Patent is hereby corrected as shown below:

In the Claims

Column 7, Line 29, "and create" should be replaced with --and to create--.

Column 8, Line 3, "signals signal" should be replaced with --signal's signal--.

Column 8, Line 10, "signals signal" should be replaced with --signal's signal--.

Signed and Sealed this
Sixteenth Day of July, 2013

Teresa Stanek Rea
*Acting Director of the United States Patent and Trademark Office*